(12) United States Patent
Junk

(10) Patent No.: US 9,752,599 B2
(45) Date of Patent: Sep. 5, 2017

(54) METHODS AND APPARATUS TO PARTIAL STROKE TEST VALVES USING PRESSURE CONTROL

(71) Applicant: Fisher Controls International LLC, Marshalltown, IA (US)

(72) Inventor: Kenneth William Junk, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 423 days.

(21) Appl. No.: 14/272,090

(22) Filed: May 7, 2014

(65) Prior Publication Data
US 2015/0323936 A1   Nov. 12, 2015

(51) Int. Cl.
F15B 19/00 (2006.01)
G05D 7/06 (2006.01)
F16K 37/00 (2006.01)
G05B 15/02 (2006.01)
F15B 5/00 (2006.01)

(52) U.S. Cl.
CPC ............ *F15B 19/005* (2013.01); *F15B 19/00* (2013.01); *F15B 19/002* (2013.01); *F16K 37/0025* (2013.01); *F16K 37/0075* (2013.01); *F16K 37/0091* (2013.01); *G05B 15/02* (2013.01); *G05D 7/06* (2013.01); *G05D 7/0635* (2013.01); *F15B 5/006* (2013.01); *F15B 2211/864* (2013.01); *F15B 2211/87* (2013.01)

(58) Field of Classification Search
None
See application file for complete search history.

(56) References Cited

U.S. PATENT DOCUMENTS

| | | | |
|---|---|---|---|
| 4,951,224 A | 8/1990 | Hokynar | |
| 6,272,401 B1 * | 8/2001 | Boger | F15B 5/006 700/282 |

(Continued)

FOREIGN PATENT DOCUMENTS

| | | |
|---|---|---|
| CN | 103411024 | 11/2013 |
| EP | 0301568 | 2/1989 |
| EP | 1500857 | 1/2005 |

OTHER PUBLICATIONS

International Searching Authority, "Invitation to Pay Additional Fees and, where Applicable, Protest Fee", in connection with PCT patent application No. PCT/US2015/029582, Aug. 24, 2014, 4 pages.

(Continued)

*Primary Examiner* — Qing Wu
(74) *Attorney, Agent, or Firm* — Hanley, Flight & Zimmerman, LLC

(57) ABSTRACT

Methods and apparatus to partial stroke test valves using pressure control are disclosed. An example method includes generating a first pressure set point for a valve positioner coupled to an actuator to actuate a valve. The first pressure set point is associated with a partial stroke test of the valve. The example method also includes controlling an output pressure of the positioner towards the first pressure set point to actuate the valve in a stroke direction. The example method further includes determining whether the valve is stuck based on the output pressure.

16 Claims, 10 Drawing Sheets

(56) References Cited

U.S. PATENT DOCUMENTS

| | | | |
|---|---|---|---|
| 2011/0114191 A1* | 5/2011 | Wheater | F16K 37/0091 137/12 |
| 2012/0227983 A1* | 9/2012 | Lymberopoulos | E21B 34/02 166/373 |
| 2012/0255617 A1* | 10/2012 | Miyazoe | F15B 13/0402 137/1 |
| 2012/0325322 A1 | 12/2012 | Li et al. | |
| 2013/0000753 A1* | 1/2013 | Penning | F15B 19/002 137/487.5 |
| 2014/0100673 A1 | 4/2014 | Amirthasamy et al. | |
| 2015/0277445 A1* | 10/2015 | Wheeler | G05D 7/0635 700/282 |

OTHER PUBLICATIONS

International Searching Authority, "International Search Report," issued in connection with PCT Application No. PCT/US2015/029582, on Dec. 11, 2015 (8 pages).

International Searching Authority, "Written Opinion," issued in connection with PCT Application No. PCT/US2015/029582, on Dec. 11, 2015 (9 pages).

\* cited by examiner

METHODS AND APPARATUS TO PARTIAL STROKE TEST VALVES USING PRESSURE CONTROL

FIELD OF THE DISCLOSURE

This disclosure relates generally to process control systems, and, more particularly, to methods and apparatus to partial stroke test valves using pressure control.

BACKGROUND

Process control systems, like those used in chemical, petroleum or other processes, typically include one or more process controllers and input/output (I/O) devices communicatively coupled to at least one host or operator workstation and to one or more field devices or instruments via analog, digital or combined analog/digital buses using any desired communication media (e.g., hardwired, wireless, etc.) and protocols (e.g., Fieldbus, Profibus®, HART®, etc.). The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers may execute and coordinate control strategies or routines using the field devices via the buses and/or other communication links communicatively coupling the field devices.

SUMMARY

Methods and apparatus to calibrate positioners and partial stroke test valves using pressure control are disclosed. An example method includes controlling an output pressure of a valve positioner towards a pressure set point. The positioner is coupled to an actuator to actuate a valve. The positioner is implemented based on an initial current-to-pressure bias. The example method also includes determining an accumulator value associated with an integrator of the positioner after the output pressure converges with the pressure set point within a threshold. The example method further includes calculating a calibrated current-to-pressure bias for the positioner based on the accumulator value.

An example valve positioner includes a pressure controller to control an output pressure of the positioner towards a pressure set point. The pressure controller implements an integrator to track an accumulated error. The example valve positioner also includes a current-to-pressure transducer to convert an electric signal from the pressure controller to a pneumatic signal. The current-to-pressure transducer is to be offset based on an initial current-to-pressure bias. The pressure controller is to calculate a calibrated current-to-pressure bias to replace the initial current-to-pressure bias based on the accumulated error when the output pressure converges with the pressure set point.

Another example method includes generating a first pressure set point for a valve positioner coupled to an actuator to actuate a valve. The first pressure set point is based on a target travel position associated with a partial stroke test of the valve. The example method also includes controlling an output pressure of the positioner towards the first pressure set point. The first pressure set point ramps in a first direction to actuate the valve towards the target travel position as the output pressure is controlled towards the first pressure set point. The example method further includes determining whether the valve is stuck based on the output pressure.

Another example valve positioner includes a travel controller to define a target travel position for a valve coupled to the positioner via an actuator. The target travel position is associated with a partial stroke test. The example valve positioner also includes a pressure controller to control an output pressure of the positioner towards a first pressure set point. The first pressure set point is based on the target travel position. The first pressure set point ramps in a first direction to actuate the valve towards the target travel position as the output pressure is controlled towards the first pressure set point.

DETAILED DESCRIPTION

Figure 1:
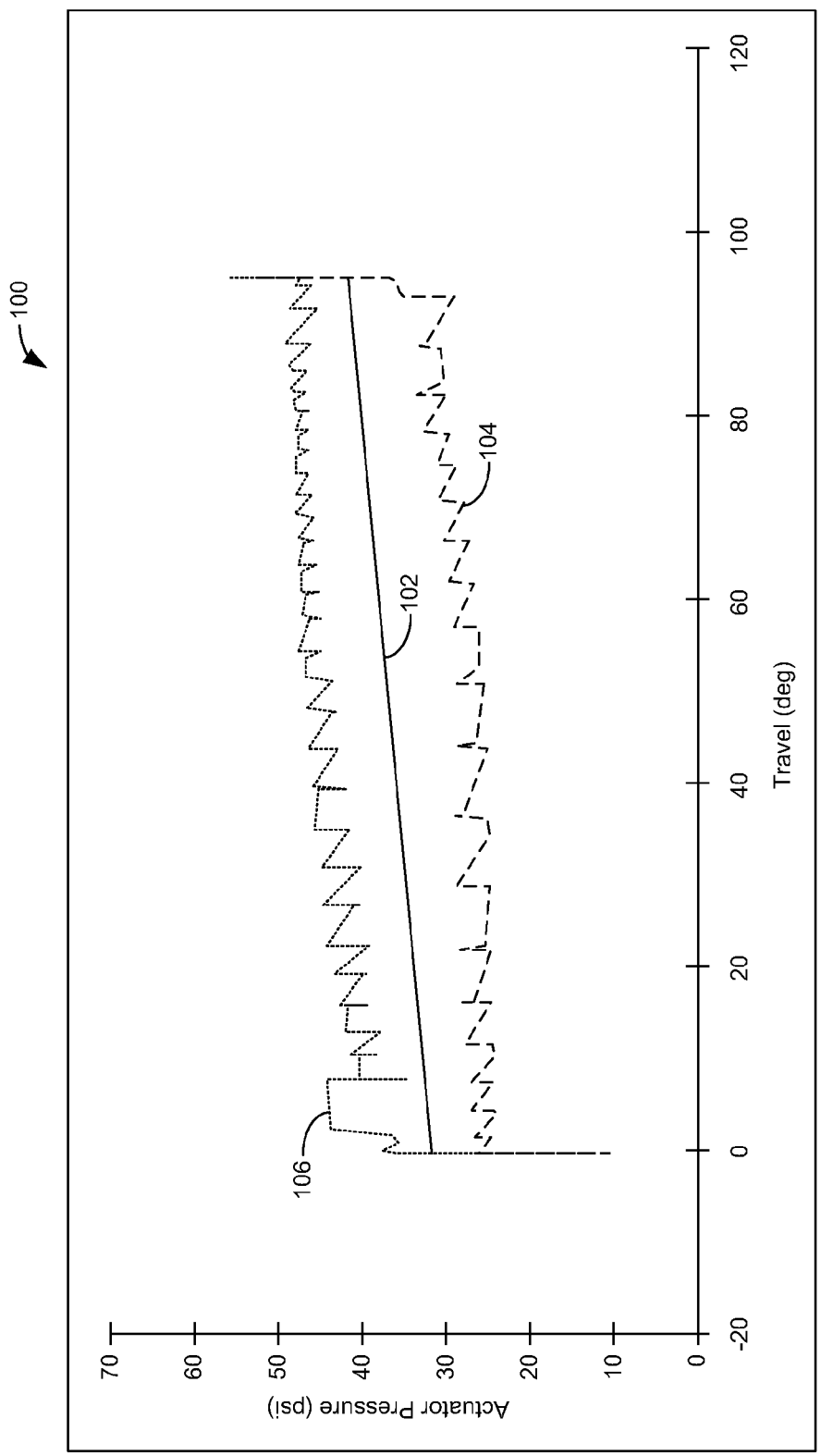
FIG. 1 is an example pressure curve 100 corresponding to the travel control of an example shutoff ball valve.

In process control systems, there are often many valves that remain in operation for extended periods of time without a change in the position of a flow control member therein. For example, a shutoff valve associated with a safety instrumented system (SIS) may remain in an open position unless tripped by a failure in the system. Valves that do not move frequently (e.g., the disc, plug, or other valve flow control member does not move frequently) can become stuck such that they do not function as expected when needed. As such, the overall reliability of a system depends on the confidence that operators (and/or engineers) managing the system have that such valves will operate properly when called upon. Accordingly, there are known methods that operate or exercise valves to test and/or verify the movement of the valves and/or identify stuck valves. For example, valves are frequently tested via partial stroke testing procedures in which the valve is moved (stroked)

part of its travel span to confirm whether the valve can still move or whether the valve is stuck. By way of clarification, references to "moving" a valve or to valve "movement" as used herein refer to the moving or movement of the disc, plug, or other flow control member within the valve. Likewise, references to a "stuck" valve as used herein refer to the flow control member of the valve becoming stuck or unable to move properly in response to a control signal.

While partial stroke testing is a viable option for some valves, many safety valves are designed to be stroked from a first end of travel (e.g., fully open) to a second end (e.g., fully closed) as quickly as possible and ensure that the valve stays closed at the second end with a tight seal. To achieve quick and reliable movement from end to end, pneumatic actuators used to close shutdown valves often have a relatively highly preloaded spring with a relatively low spring rate. Typically, shutdown valves are kept fully open (e.g., during normal operation) with a fully pressurized actuator. In such examples, once air pressure decreases below the upper bench set of the valve and the associated friction band, the force of the spring becomes sufficient to move the valve to the closed position with relatively little further decrease in the pressure. In other words, a relatively small change in pressure can result in a relatively large change in travel position of the valve. As a result, controlling the travel position of such a valve is difficult because of the sensitivity to the pressure input within the bench set span. Additionally, to satisfy tight shutoff requirements, in many instances the valve may be double sealed and/or include other types of tight seals that produce a lot of friction in the valve. Relatively high friction in such valves can result in the stick-slip phenomenon where valve movement is characterized by repeated jogs rather than smooth, linear motion. Such non-linear motion further exacerbates the ability to control the travel position of such valves for purposes of partial stroke testing and/or general throttling control.

The above characteristics of certain shutdown valves are demonstrated graphically in FIG. 1. FIG. 1 is an example pressure curve 100 corresponding to the travel control of a typical SIS shutoff ball valve. In the example of FIG. 1, the middle solid line 102 is representative of the pressure to overcome the spring force in the actuator along the travel span of the valve without friction. As shown in the illustrated example, the valve has a bench set of approximately 32 psi to 42 psi for a bench set span of approximately 10 psi. The lower dotted line 104 shown in FIG. 1 corresponds to the actual pressure output to the actuator as the valve turns from a first hard stop end of travel (in this case, 95 degrees of rotation) to a second hard stop end of travel (0 degrees). The upper dotted line 106 corresponds to the actual pressure output to the actuator as the valve turns from the second hard stop back to the first hard stop. The difference in pressure between the lower dotted line 104 and the middle solid line 102 corresponds to the single-sided friction in the valve as it moves in a first direction from the first hard stop (e.g., 95 degrees) to the second hard stop (e.g., 0 degrees). The difference in pressure between the upper dotted line 106 and the middle solid line 102 corresponds to the single-sided friction in the valve as it moves back in a second direction from the second hard stop (e.g., 0 degrees) to the first hard stop (e.g., 95 degrees). As shown in the pressure curve 100 of FIG. 1, the single-sided friction in both directions is not constant but varies around 10 psi or roughly 100% of the bench set span. Typically, the pressure operates at full supply (e.g., 100% of supply pressure) under normal conditions, which in the illustrated example is about 60 psi. Thus, in the illustrated example, the valve represented by the trace in FIG. 1 will not begin moving in the first direction (from 95 degrees of rotation towards 0 degrees of rotation) until the actuator is vented down to about 32 psi (42 psi upper bench set less 10 psi for single sided friction) and the valve will traverse its entire travel span when the pressure is decreased to about 22 psi (32 psi lower bench set less 10 psi for single sided friction). On the return path (moving from 0 degrees of rotation towards 95 degrees of rotation), the valve represented in FIG. 1 will not begin moving until the actuator is pressurized up to about 42 psi (32 psi lower bench set plus 10 psi for single sided friction) and the valve will traverse its entire travel span when the pressure is increased to about 52 psi (42 psi upper bench set plus 10 psi for the single sided friction). For comparison, for valves intended to be controlled to a particular position other than end to end (e.g., throttling valves rather than on-off valves), the desired level of friction (e.g., single-sided friction) is often less than 10% of the bench set span. As such, the high friction (to ensure a tight seal) in the valve characterized in FIG. 1 and the narrow bench set span (to ensure quick movement from end to end) are such that the valve is not conducive to reliable travel control.

Due to the high friction in the valve, the valve may not move (e.g., will stick) until a certain amount of pressure has built up to overcome static friction (sometimes referred to as stiction) at which point the valve will suddenly jog or move a small distance (e.g., slip). Such a sudden jog in the valve and actuator results in a sudden change in volume of the actuator and, thus, a change in pressure. As a result, the valve will stick again until the pressure builds up sufficiently to force the valve to slip again. This repeated variation in the pressure and jogging of the valve is represented in FIG. 1 by the jagged spikes along the lower and upper dotted lines 104, 106. Because of these stick-slip dynamics and the general design of high-friction on-off valves, conventional approaches to partial stroke testing, which require controlling the valve to a travel position between opposing ends, are unreliable.

In a typical partial stroke test, the travel set point for a valve is moved from its normal position a certain portion of the travel span (e.g., 10%, 20%, etc.) over a period of time (e.g., the set point changes as a ramp rather than a step) and then returns the set point to the normal position of the valve (e.g., the normal position before the partial stroke test). For example, a typical shutdown valve (e.g., a fuel shutoff valve) normally operates at 100% travel (e.g., fully open) such that a partial stroke test may move the valve to 90% travel. In contrast, a vent valve (e.g., a pressure relief valve) normally operates at 0% lift such that a partial stroke test may move the valve to 10% lift. As the travel set point is ramped in a first direction and then ramped in a second direction during a partial stroke test, the actual travel of the valve is used as feedback to control the valve to follow the set point. If the error signal becomes too large (e.g., the actual valve travel fails to follow the set point) the test is aborted and a stuck valve alert is triggered. However, as described above, some on-off valves do not always move immediately in response to a set point change (even though the internal states (e.g., pressure) are changing) because of the high level of friction and stick-slip. That is, high-friction valves are not designed to follow a ramping travel set point because they are not designed for travel control. As such, a positioner may not be able to distinguish between such a valve that is transitioning from a hard stop to movement and a valve that is actually stuck. Furthermore, when the valve is stuck there is no movement in the valve. Without movement of the valve, there is no travel feedback to control the valve such that the system effectively becomes open loop controlled and the internal states may saturate and begin winding up. Current approaches overcome this problem by defining a threshold beyond which the pressure may not pass before the partial stroke test is aborted, the set point is returned to its normal state, and a stuck valve alert is triggered. However, these current approaches may be insufficient on critical systems (such as many shutoff valves associated with safety instrumented systems) where it is desirable to maintain closed loop control of the valve. In known approaches based on travel control, control effectively becomes open looped such that the internal states (e.g., pressure) are unknown and may become saturated if the valve being tested is stuck. In such instances, if the increased actuator torque overcomes the friction force in the valve, the valve may become unstuck and begin to move. In such instances, the positioner may have vented the actuator completely and not have the flow capacity to reverse the direction leading to a spurious trip in which the valve fully closes and causes an unintended shutdown. Through pressure control as described herein, the system remains in closed loop control so that the occurrence of such unintended circumstances is reduced.

In addition to the problems of travel control of high-friction on-off valves described above in connection with partial stroke testing, similar problems arise in other situations where throttling control of a valve (e.g., controlling the valve based on travel position between ends of the travel span) is desirable. For example, to reliably drive a pneumatic actuator with a positioner, the positioner needs to be calibrated. In some examples, the positioner includes a current-to-pressure (I/P) transducer to convert an electrical input signal into a pressure signal that drives a relay to produce an output pressure corresponding to the input signal. For the I/P transducer and the relay to properly drive an actuator, they must be balanced or calibrated. Calibration typically involves defining a nominal or initial I/P bias that is incorporated into the control signal and adjusting the value to a final calibrated I/P bias that nulls out the positioner. In some examples, the nominal or initial I/P bias can be approximated based on manufacturing specifications. However, the precise value of the I/P bias for the positioner is sensitive to the conditions (e.g., temperature, supply pressure, etc.) in which the positioner is being implemented and, thus, the I/P bias is typically calibrated once installed in the field. Furthermore, calibration occurs in the field to arrive at as accurate an I/P bias as possible because even a small error in the I/P bias can impact the control of the valve, especially where the valve is a high-friction valve with a narrow bench set span because small changes in pressure can produce large changes in travel. In some approaches, the I/P bias is calibrated by beginning with the nominal or initial I/P bias and defining a travel set point (typically 50% of travel span) and driving the valve to the travel set point. In such examples, as the valve is controlled to the set point, the integrator of the positioner winds up until the set point is reached. If the nominal I/P bias is properly calibrated, the value of the accumulated error for the integrator should be zero. Thus, if the accumulator is not zero, the value is added to the nominal I/P bias to determine the final or calibrated I/P bias and then reset or unwind the integrator (e.g., set the accumulator to zero).

Accordingly, the method to calibrate a positioner relies on travel control of the valve which, as described above, is problematic for high-friction valves. In the context of I/P bias calibration, as such valves are moved towards the 50% set point, the valve periodically sticks due to friction. As a result, the integrator to winds up too far such that when the valve finally slips and reaches the set point, the accumulator value is not representative of what is actually needed to correct the initial or nominal I/P bias estimate. Depending upon the end from which the valve flow control member approaches the 50% set point (e.g., from the 0% end or from the 100% end), the final I/P bias generated through the process can be substantially different and, thus, unreliable. Furthermore, in some situations, the stick-slip phenomenon may cause the valve to stick before the set point and then slip past or overshoot the set point and may overshoot on the way back such that the valve limit cycles and does not converge on the set point to enable calibration of the I/P bias.

Examples disclosed herein overcome the above challenges to partial stroke testing by implementing example positioners constructed in accordance with the teachings disclosed herein to control valves based on feedback corresponding to the pressure output to the actuator rather than the travel of the valve. That is, disclosed examples implement pressure control rather than the traditional travel control. In this manner, the issues of stick-slip movement of the valve as well as other motion losses (e.g., linkage slop) no longer affect the control feedback. As a result, in disclosed examples, higher gains are possible without destabilizing the system. Furthermore, control of positioners implemented in accordance with the teachings disclosed herein never becomes open loop but, rather, remains closed loop so that there is no risk of losing track of internal states. In some examples, travel is monitored (e.g., travel feedback) while implementing pressure control but the travel feedback is not relied on for control. In some examples, the positioner is constructed to implement a cascaded control loop in which the primary loop is based on pressure control and the supervisory loop is based on travel control. In particular, methods to perform partial stroke testing based on pressure control are disclosed.

Furthermore, methods to calibrate the I/P bias in example positioners using pressure control are disclosed. In some examples, the I/P bias is calibrated when the actuator is at a hard stop (e.g., when the valve is fully open or fully closed). When the actuator is at a hard stop, the volume in the actuator is fixed because the actuator does not move. Thus, the actuator will not suddenly jog (e.g., due to stick-slip in the valve) thereby suddenly changing the volume of the actuator resulting in a corresponding sudden change in pressure. As such, the system does not overshoot the set point and does not unnecessarily wind up as in the known approach described above. Instead, the system accurately converges on the set point without such problems and thereby enables reliable calibration of the I/P bias. In other examples, the I/P bias is calibrated based on a pressure set point corresponding to a travel position between the travel endpoints.

In addition to the disclosed methods to implement partial stroke testing and calibration, pressure-based control may be implemented for the general throttling control of valves. In some examples, a positioner can switch between travel control (i.e., use of valve travel or position feedback) and pressure control (i.e., use of output pressure feedback) as described herein. In some examples, a positioner may implement pressure control when the direction of movement of a valve is initially reversed to assist in traversing the friction band which, as noted above in connection with FIG. 1, can be 100% or more of the bench set span for high friction valves. In this manner, the control loop always employs a feedback (e.g., output pressure) to maintain closed loop control during such a reversal rather than becoming effectively open loop while the valve is not moving (and, thus, not providing travel or position feedback) due to friction. Furthermore, implementing pressure control during a valve movement reversal reduces (e.g., minimizes) the overall dead band of the travel controller.

While the examples disclosed herein are primarily described in the context of safety on-off shutdown valves, the teachings disclosed herein are not so limited. Rather, pressure control, as described herein, can be implemented for any type of valve whether an on-off valve or a throttling valve. More generally, any type of valve can exhibit the problems (e.g., high friction) noted above and, thus, can benefit from the teachings disclosed herein. For example, valves that use graphite packing and/or metal-on-metal seals may exhibit a lot of friction and, thus, experience the potential for the problems associated with the stick-slip phenomenon outlined above. As some specific examples, pressure control may be beneficially implemented in shutdown valves, turbine bypass control valves, antisurge control valves, and/or cryogenic control valves. Further, valves designed for low friction may wear over time increasing the level of friction present in the valve to cause the same problems as valves designed with high friction.

Figure 2:
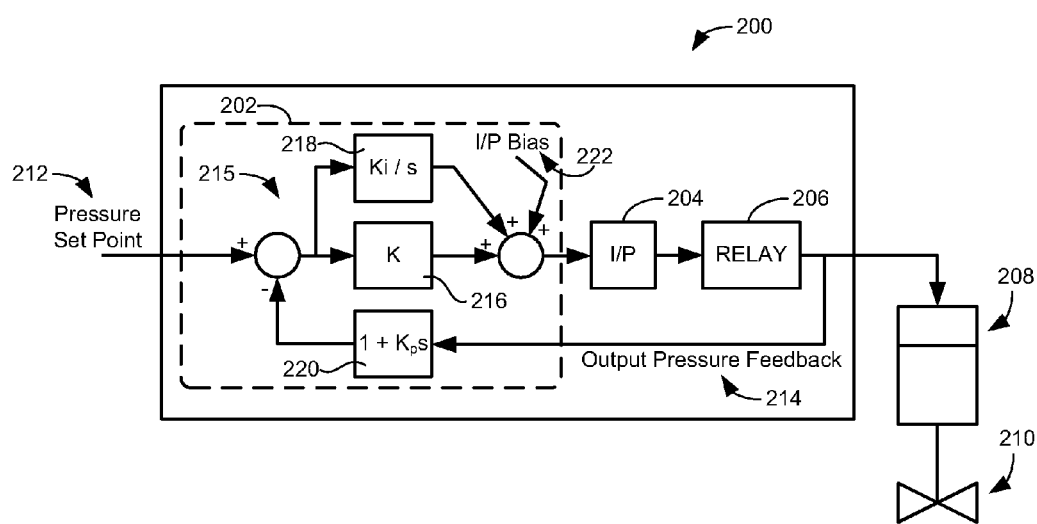
FIG. 2 is a schematic illustration of an example positioner 200 constructed in accordance with the teachings disclosed herein.

FIG. 2 is a schematic illustration of an example positioner 200 constructed in accordance with the teachings disclosed herein. The example positioner 200 includes an example microprocessor 202, a current-to-pressure (I/P) transducer 204, and a relay 206. In the illustrated example, the microprocessor 202 is configured to drive an actuator 208 coupled to a valve 210 based on an electrical input signal (e.g., a pressure set point 212) and feedback 214 corresponding to the output pressure provided to the actuator 208. More particularly, the example microprocessor 202 of the example positioner 200 implements proportional-integral-derivative (PID) control of the output pressure. As shown in the illustrated example, the microprocessor 202 includes a proportional or forward path gain 216, an integrator 218, and a pressure derivative compensator 220 that are used in combination with the pressure set point 212 and the output pressure feedback 214 to generate a signal that drives the I/P transducer 204. This feedback control loop is referred to herein as a pressure control loop or pressure controller 215. In some examples, as shown, the derivative compensator 220 operates in the feedback path of the pressure controller 215 rather than the forward path to allow step changes to the pressure set point 212 to be smoothed. In the illustrated example, the microprocessor 202 stores a value for an I/P bias 222 used to balance the example positioner 200. In the illustrated example, the I/P bias 222 is added to the drive signal for the I/P transducer 204 to offset the signal corresponding to the null position of the example positioner 200.

In the illustrated example, the positioner 200 receives a supply pressure that is directed through the I/P transducer 204 to provide an input pressure to the relay 206 that is proportional to the drive signal generated by microprocessor 202. In some examples, the relay 206 uses the input pressure from the I/P transducer 204 to form a proportional output pressure (or flow) used to drive the actuator 208. In some examples, the actuator 208 is a single acting actuator with a spring return. In some examples, a spool valve is implemented instead of the relay 206. An example implementation of such a spool valve is described in U.S. patent application Ser. No. 14/075,804, filed on Nov. 8, 2013, which is hereby incorporated by reference in its entirety. As shown in the illustrated example, the output pressure feedback 214 corresponds to the pressure generated by the relay 206 to drive the actuator 208. In this manner, the positioner 200 can implement control of the valve 210 based on pressure rather than other known positioners that rely on position feedback corresponding to travel or movement of the valve 210.

While an example manner of implementing the example microprocessor 202 of the example positioner 200 of FIG. 2 is illustrated in FIG. 2, one or more of the elements, processes and/or devices illustrated in FIG. 2 may be combined, divided, re-arranged, omitted, eliminated and/or implemented in any other way. Further, the example forward path gain 216, the example integrator 218, the example pressure derivative compensator 220, and/or, more generally, the example microprocessor 200 of FIG. 2 may be implemented by hardware, software, firmware and/or any combination of hardware, software and/or firmware. Thus, for example, any of the example forward path gain 216, the example integrator 218, the example pressure derivative compensator 220, and/or, more generally, the example microprocessor 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example forward path gain 216, the example integrator 218, ad/or the example pressure derivative compensator 220 is/are hereby expressly defined to include a tangible computer readable storage device or storage disk such as a memory, a digital versatile disk (DVD), a compact disk (CD), a Blu-ray disk, etc. storing the software and/or firmware. Further still, the example microprocessor 202 of FIG. 2 may include one or more elements, processes and/or devices in addition to, or instead of, those illustrated in FIG. 2, and/or may include more than one of any or all of the illustrated elements, processes and devices.

Figure 3:
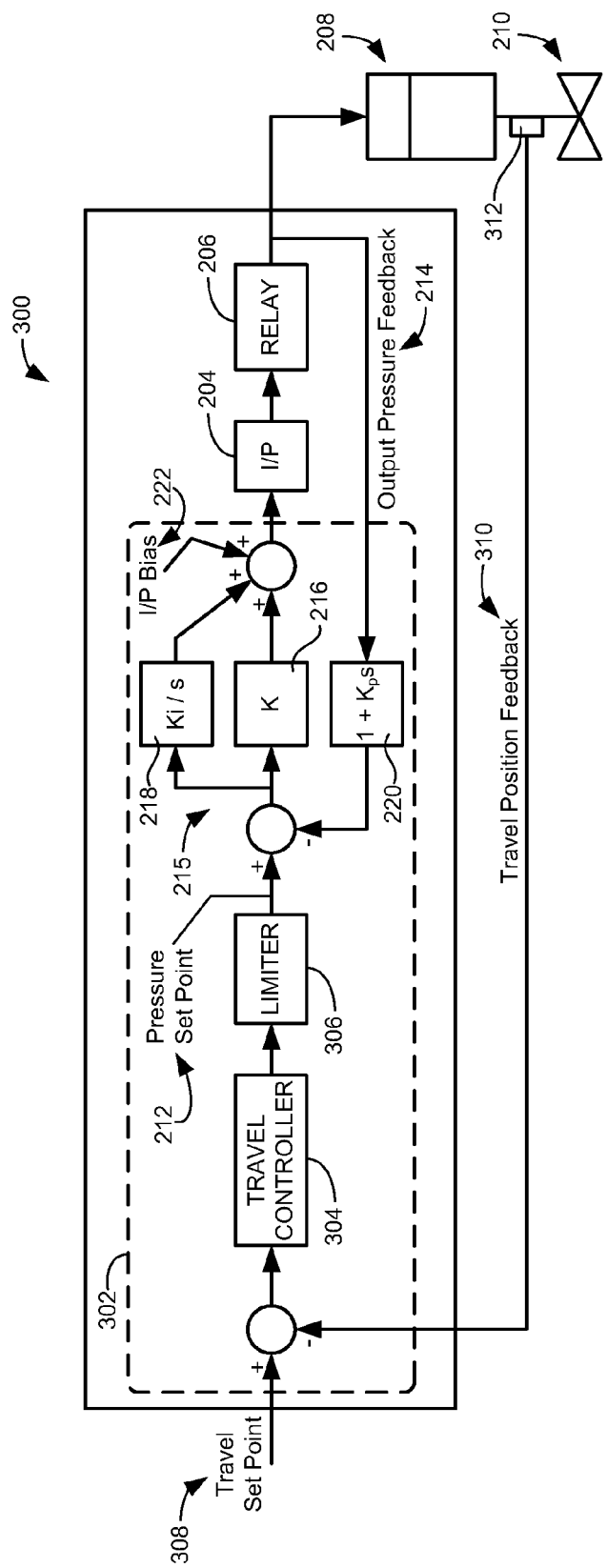
FIG. 3 is a schematic illustration of another example positioner 300 constructed in accordance with the teachings disclosed herein.

FIG. 3 is a schematic illustration of another example positioner 300 constructed in accordance with the teachings disclosed herein. The example positioner 300 of FIG. 3 is similar to the positioner 200 of FIG. 2 except that the pressure control loop or controller 215 described in FIG. 2 is cascaded with a supervisory travel control loop or travel controller 304 in the example positioner 300 of FIG. 3. More particularly, the example positioner 300 includes a microprocessor 302 that includes the forward path gain 216, integrator 218, pressure derivative compensator 220, and I/P bias 222 as described in FIG. 2 that generate a drive signal for the I/P transducer 204. As with the example positioner 200 of FIG. 2, the I/P transducer 204 of the illustrated example of FIG. 3 produces a pressure signal for the relay 206 to generate an output pressure to drive the actuator 208 and the valve 210. Additionally, similar to the example of FIG. 2, in the example positioner 300 of FIG. 3, the output pressure from the relay 206 corresponds to the feedback 214 compared with the pressure set point 212 to determine an error that serves as the basis to generate the drive signal for the I/P transducer 204 to continue to control the output pressure towards the set point.

However, unlike the example positioner 200 of FIG. 2, the example positioner 300 of FIG. 3 includes a travel controller 304 and a limiter 306 to implement a supervisory control loop. In the illustrated example, a travel set point 308 is combined with a feedback 310 corresponding to the travel or position of the valve 210. In some examples, the travel position feedback 310 is provided via a position sensor 312 coupled to the valve 210. In some examples, the position sensor 312 is incorporated into the positioner 300. Using the travel set point 308 and the travel position feedback 310, the example travel controller 304 and limiter 306 generate the pressure set point 212, which is provided to the pressure control loop 215 as described above. The logic implemented in the travel controller 304 may be any suitable logic. For instance, the travel controller 304 may provide on/off logic to change the pressure set point 212 during a partial stroke test based on the feedback 310 from the position sensor 312. That is, in some examples, the travel controller 304 provides a first signal (e.g., an "on" signal) to initiate a partial stroke test that defines a pressure set point 212 that will drive the I/P transducer 204 to move the valve 210. In some such examples, once the position sensor 312 detects travel movement (e.g., a threshold level of displacement), the travel controller 304 provides a second signal (e.g., an "off" signal) that changes the pressure set point 212 to drive the I/P transducer 204 back to the starting conditions. In some examples, this on/off or latching type functionality of the travel controller 304 switches when the travel position feedback 310 indicates the valve 210 has moved to a particular location such as a target travel position. In some examples, the target travel position corresponds to the travel set point 308. In some examples, the target travel position is at a distance inside the target travel set point 308 (relative to an initial position of the valve 210) to ensure that the valve 210 moves past the target travel position during a partial stroke test as the basis for confirming whether the valve 210 is functioning properly or is stuck. In other examples, the travel controller 304 implements a more complex control routine similar to a more traditional travel controller except the travel controller is supervisory over the cascaded pressure controller 215. In some examples, the positioner 300 of FIG. 3 is used to control a piston actuator that does not have a spring return.

In the illustrated example, the limiter 306 modifies the signal received from the travel controller 304 to generate an appropriate pressure set point 212, which is provided to the pressure controller 215. In some examples, the limiter 306 converts a step input signal from the travel controller 304 by converting it into a ramp shaped signal. For example, the on/off signals generated by the travel controller 304 described above may correspond to pressure set points that drive the I/P transducer 204 to cutoff points (e.g., 0% to vent the actuator 208 and 100% to fill the actuator 208). Accordingly, during a partial stroke test, the travel set point 308 may be set to 80% to test the movement of the valve normally operating at a position corresponding to 100% of valve travel span resulting in the travel controller 304 generating a signal to drive the I/P transducer 204 to 0%. However, providing such a step input pressure set point that is at the opposite end of the pressure range from the initial conditions would not be an effective input for a partial stroke test. Accordingly, in some examples, the limiter 306 converts the step input into a ramping set point by defining a rate of change in the pressure set point (e.g., −1 psi/sec) to maintain control of the system based on controlling the pressure. In some such examples, once a target travel position is reached (85% of travel span (e.g., 5% about the travel set point 308 in this example)) the travel controller 304 generates a new signal to return the valve to 100%. In some examples, the limiter 306 converts the new signal into a similar ramped pressure set point described above but in the opposite direction to return the pressure to the starting or initial conditions. In some examples, rather than converting step signals into ramped signals, the limiter 306 sets limits on the range of pressure set point values to at least reduce large step signals.

Additionally or alternatively, in some examples, the limiter 306 defines upper and lower pressure thresholds to terminate a partial stroke test when the travel position feedback 310 indicates the valve 210 failed to move (e.g., because the valve is stuck) and/or to trigger an alarm indicating the valve 210 failed the partial stroke test. For example, if the valve 210 becomes stuck while the pressure is vented (at a rate defined by the limiter 306) such that the travel position feedback 310 never reaches the target travel position (85% in this example), the pressure controller 215 continues to decrease the pressure by controlling the pressure based on the ramped pressure set point. However, in some examples, the limiter 306 defines a lower pressure threshold or stroke pressure threshold below which the limiter 306 automatically reverses the pressure set point 212 to stop stroking the valve 210 and begin ramping the pressure set point 212 back up to the initial conditions. Accordingly, when the output pressure feedback 214 passes the lower pressure threshold, the microprocessor 302 generates a valve failure alert indicative of a stuck valve and returns to the pressure to normal (e.g., initial) conditions. In some examples, the valve 210 moves to the desired target travel position but becomes stuck when the pressure is ramped back up to return the valve 210 to normal operating conditions. Such a scenario may be detected based on the output pressure feedback 214 exceeding a corresponding upper pressure threshold or return pressure threshold defined by the example limiter 306 when the travel position feedback 310 indicates the valve 210 has not returned to the corresponding hard stop (e.g., 100% of travel or within a minimum threshold displacement of 100% of travel).

While an example manner of implementing the example microprocessor 302 of the example positioner 300 of FIG. 3 is illustrated in FIG. 3, one or more of the elements, processes and/or devices illustrated in FIG. 3 may be combined, divided, re-arranged, omitted, eliminated and/or implemented in any other way. Further, the example forward path gain 216, the example integrator 218, the example pressure derivative compensator 220, and/or, more generally, the example microprocessor 302 of FIG. 3 may be implemented by hardware, software, firmware and/or any combination of hardware, software and/or firmware. Thus, for example, any of the example forward path gain 216, the example integrator 218, the example pressure derivative compensator 220, and/or, more generally, the example microprocessor 302 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example forward path gain 216, the example integrator 218, ad/or the example pressure derivative compensator 220 is/are hereby expressly defined to include a tangible computer readable storage device or storage disk such as a memory, a digital versatile disk (DVD), a compact disk (CD), a Blu-ray disk, etc. storing the software and/or firmware. Further still, the example microprocessor 302 of FIG. 3 may include one or more elements, processes and/or devices in addition to, or instead of, those illustrated in FIG. 3, and/or may include more than one of any or all of the illustrated elements, processes and devices.

Figure 4:
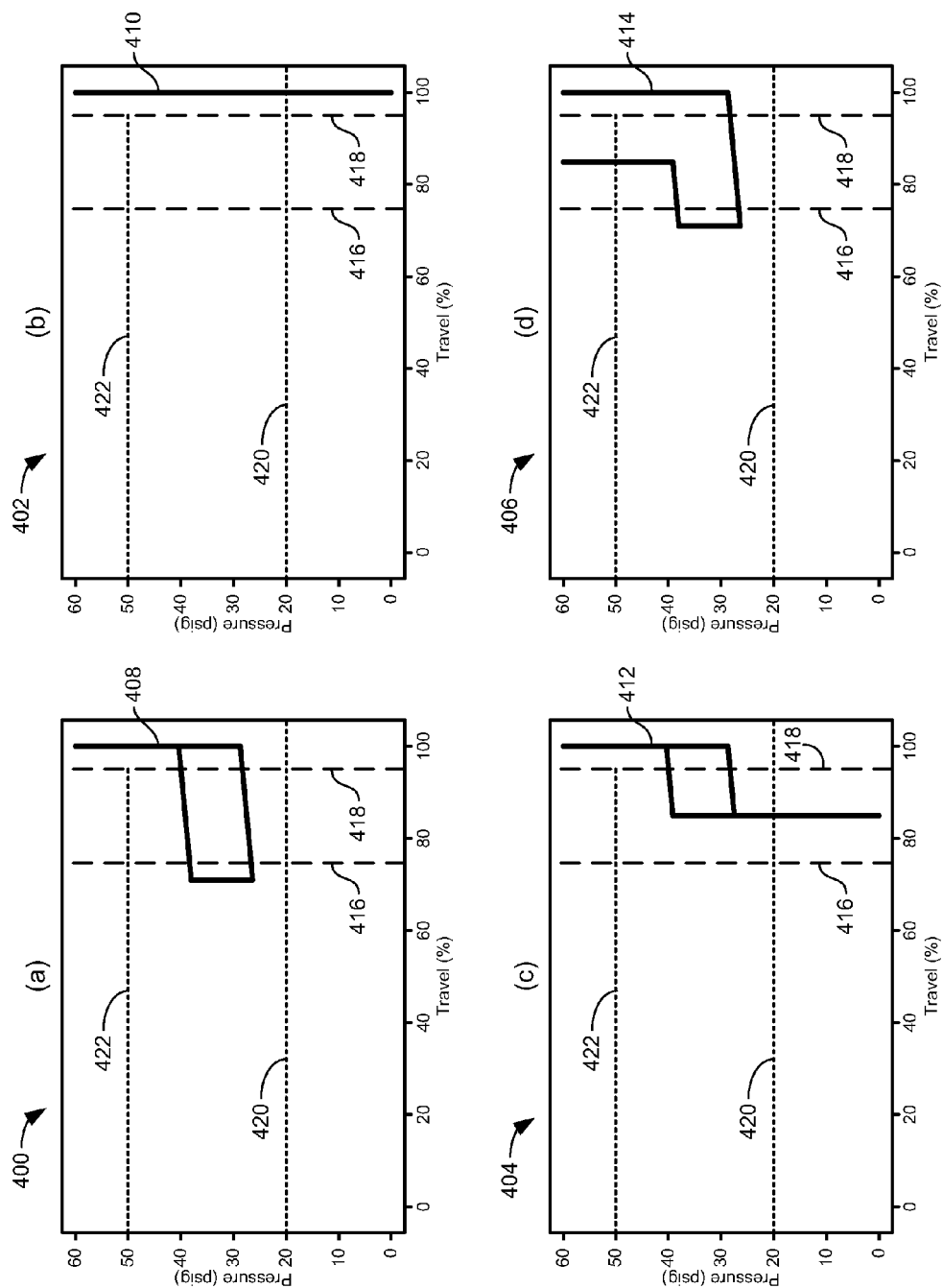
FIG. 4 illustrates example pressure signatures for valves undergoing an example partial stroke test as described herein.

FIG. 4 illustrates graphs 400, 402, 404, 406 showing corresponding example pressure signature curves 408, 410, 412, 414 for valves undergoing an example partial stroke test as described herein. The signature curve 408 in the first graph 400 is representative of a properly functioning valve undergoing a partial stroke test controlled by one of the positioners 200, 300 described above. In the illustrated example, the initial pressure (e.g., the pressure under normal operating conditions) provided to the valve is at 60 psi and the initial position of the valve is 100% of the travel span (e.g., the valve is at the hard stop associated with the high pressure endpoint of the travel span). In some examples, the initial pressure corresponds to 100% of the pressure supply. In some examples, the initial pressure may be less than the full pressure supply. During a partial stroke test, in some examples, the pressure controller 215 controls the pressure actuating the valve to follow a set point that ramps down from the initial pressure. For a properly working valve, as illustrated in the first graph 400 of FIG. 4, as the pressure decreases the position of the valve will remain at the hard stop until the pressure decreases below the upper bench set pressure (determined by the spring load) and decreases past the friction band. In the illustrated example, as the pressure controller 215 controls the pressure down past the friction band, the valve moves away from the 100% travel position. For purposes of explanation, the direction of movement of the valve away from the initial position of the valve is referred to as the stroke direction associated with the partial stroke test. In the graph 400 of the illustrated example of FIG. 4, the pressure continues to decrease and the valve continues to move until the position of the valve passes a target travel position 416. In some examples, the target travel position 416 corresponds to a position along the travel span at which the positioner 200, 300 determines that the valve successfully passed the partial stroke test in the stroke direction. The target travel position 416 may be any suitable position along the travel span (e.g., 10%, 20%, 30% from the initial position). In the illustrated example, the target travel position 416 is different than a travel set point because, as shown in the first graph 400, the valve is controlled passed the target travel position 416.

In some examples, the valve reaching the target travel position 416 (indicating the valve is not stuck in the stroke direction), serves as a trigger to switch or reverse the ramp for the pressure set point for the pressure controller 215 such that the pressure is controlled back towards the initial conditions and, thus, to return the valve to its initial position (e.g., at the hard stop). As the pressure increases on this return path, the valve initially remains at the same position while the pressure passes through the friction band, at which point the valve moves back towards the initial position of the valve (e.g., the hard stop at 100% travel). For purposes of explanation, the direction of movement of the valve towards the initial position of the valve is referred to as the return direction associated with the partial stroke test. In the graph 400 of the illustrated example of FIG. 4, the pressure controller 215 continues to increase the pressure and the valve continues to move in the return direction until the position of the valve returns to the initial position associated with the hard stop. In some examples, the pressure controller 215 continues to increase the pressure until the pressure returns to the initial conditions (e.g., 100% of the pressure supply). In some examples, the positioner 200, 300 determines that the valve successfully passed the partial stroke test in the return direction when the position of the valve passes a minimum threshold displacement 418 (e.g., 5% of the travel span from the calibrated hard stop position of the valve). The minimum threshold displacement 418 enables a positioner to account for any errors in the monitored travel position due to, for example, lost motion between the actuator and the valve shaft, lost motion between the valve shaft and the valve flow control member, and/or wind up in the valve shaft.

The signature curves 410, 412, 414 in the second, third, and fourth graphs 402, 404, 406 of FIG. 4 are representative of different failure modes of a valve undergoing the same partial stroke test as described for the first graph 400. The second curve 410 shown in graph 402 is representative of a valve that is fully stuck in that the position of the valve remains at the hard stop (e.g., 100% of travel) as the pressure is decreased from the initial pressure (e.g., full pressure supply) down to zero pressure. In some examples, the position of the valve may vary somewhat as the pressure decreases to zero. However, in some examples, if the position of the valve remains inside the minimum threshold displacement 418, the positioner 200, 300 may determine that the valve has not left the hard stop because the variation in the travel position may correspond to lost motion. In some examples, the positioners 200, 300 define a lower pressure threshold or stroke pressure threshold 420 to limit the extent or range of the pressure set point driving the pressure controller 215 in the stroke direction. For example, if the positioner 200, 300 determine that the pressure has passed the stroke pressure threshold 420, the positioner 200, 300 may abort the partial stroke test and generate an alert indicating that the valve is stuck and/or that the valve failed the partial stroke test. In this manner, the pressure does not decrease all the way to zero pressure as is represented by the curve 410. In some examples, once the positioner 200, 300 determines that the pressure has passed the stroke pressure threshold 420, the pressure controller 215 controls the pressure back to the initial state before the partial stroke test began.

The third curve 412 shown in graph 404 is representative of a valve that initially moves off of the hard stop (e.g., moves beyond the minimum threshold displacement 418) but gets stuck while moving in the stroke direction before reaching the target travel position 416 such that a continued decrease in the pressure does not result in further movement of the valve. In some examples, if the positioner 200, 300 determine that the pressure has passed the stroke pressure threshold 420, the positioner 200, 300 may abort the partial stroke test and generate an alert indicating that the valve is stuck in the stroke direction and/or that the valve failed the partial stroke test in the stroke direction. In some examples, once the positioner 200, 300 determines that the pressure has passed the stroke pressure threshold 420, the pressure controller 215 controls the pressure back to the initial state before the partial stroke test began. In some examples, the valve may return to its initial position as shown in the illustrated example. Accordingly, in some examples, there may be some movement in the valve. However, because the valve could not be controlled to the target travel position, the positioner 200, 300 may nevertheless indicate that the valve is a stuck valve (e.g., the valve failed the partial stroke test).

The fourth curve 414 shown in graph 406 is representative of a valve that successfully passes the partial stroke in the stroke direction in the same manner as a properly functioning valve as described in connection with the first graph 400. However, as shown in the fourth curve 414, as the pressure increases back to the initial conditions, the valve gets stuck before returning to the hard stop (e.g., before reaching the minimum threshold displacement 418) such that a continued increase in the pressure does not result in further movement of the valve. In some examples, the positioners 200, 300 define an upper pressure threshold or return pressure threshold 422 to trigger an alarm indicating that the valve failed the partial stroke test and that the valve is stuck in the return direction. In some examples, unlike the stroke pressure threshold 420 which may serve as a limit on the extent of the pressure, the return pressure threshold 422 only triggers an alert or alarm. In such examples, the pressure controller 215 continues to control the pressure back to the initial conditions. In some examples, as shown in FIG. 4, the return pressure threshold 422 only applies when the position of the valve is outside of the minimum threshold displacement 418. In this manner, if the valve moves in the return direction to within the minimum threshold displacement 418 (indicative of the valve successfully returning to the hard stop), the continued increase in the pressure back to the initial state (above the return pressure threshold) will not incorrectly trigger an alarm indicating a stuck valve.

Figure 5:
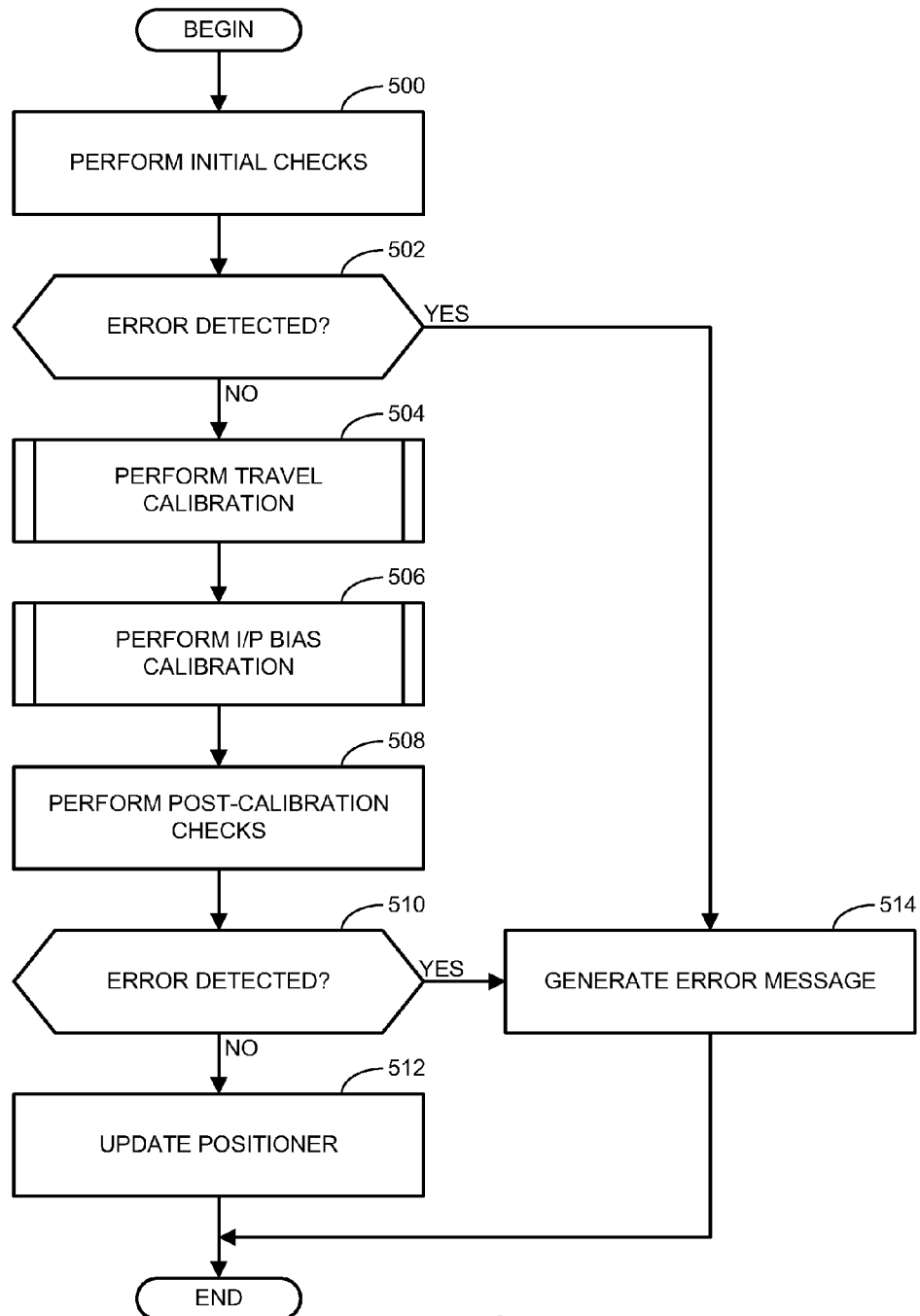
FIGS. 5-7 are flowcharts representative of example methods for implementing the example positioners of FIGS. 2 and/or 3 to calibrate a positioner for implementation on a pneumatically actuated valve.
Figure 6:
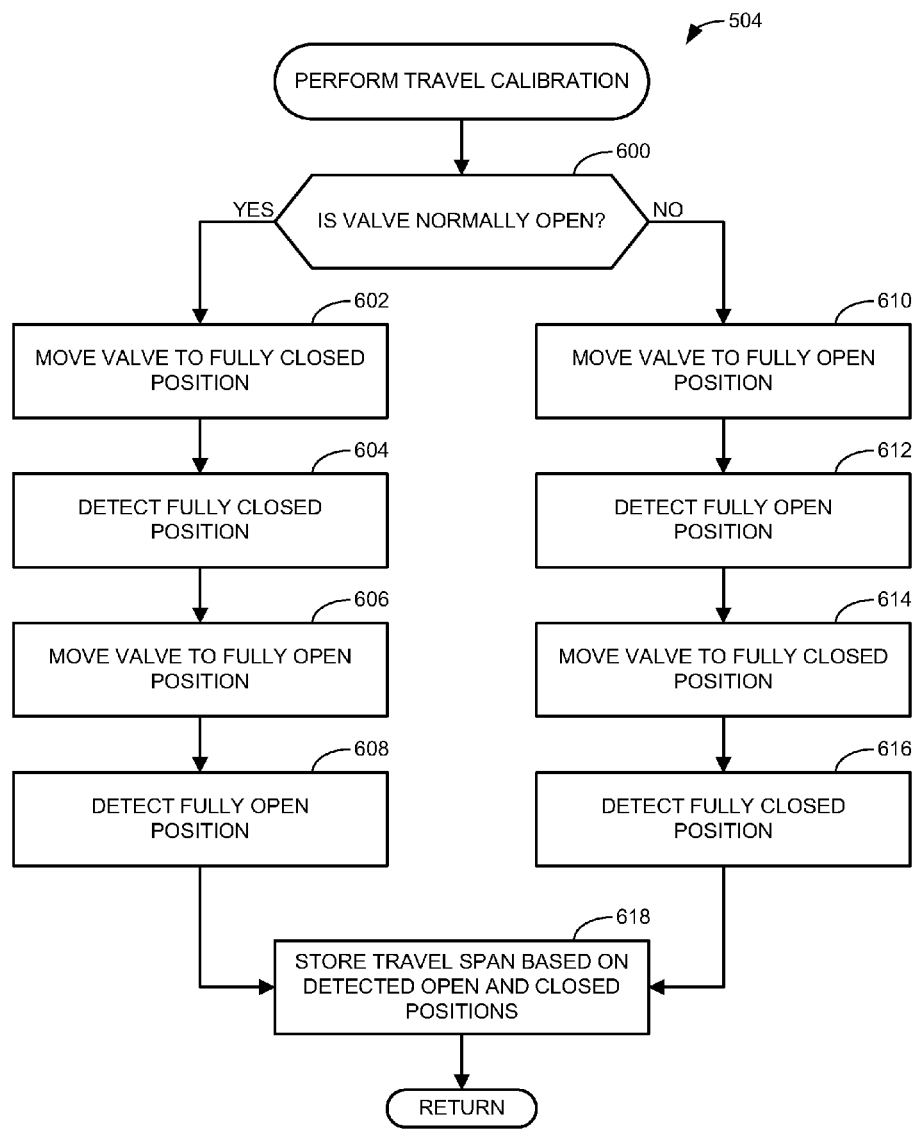
Figure 7:
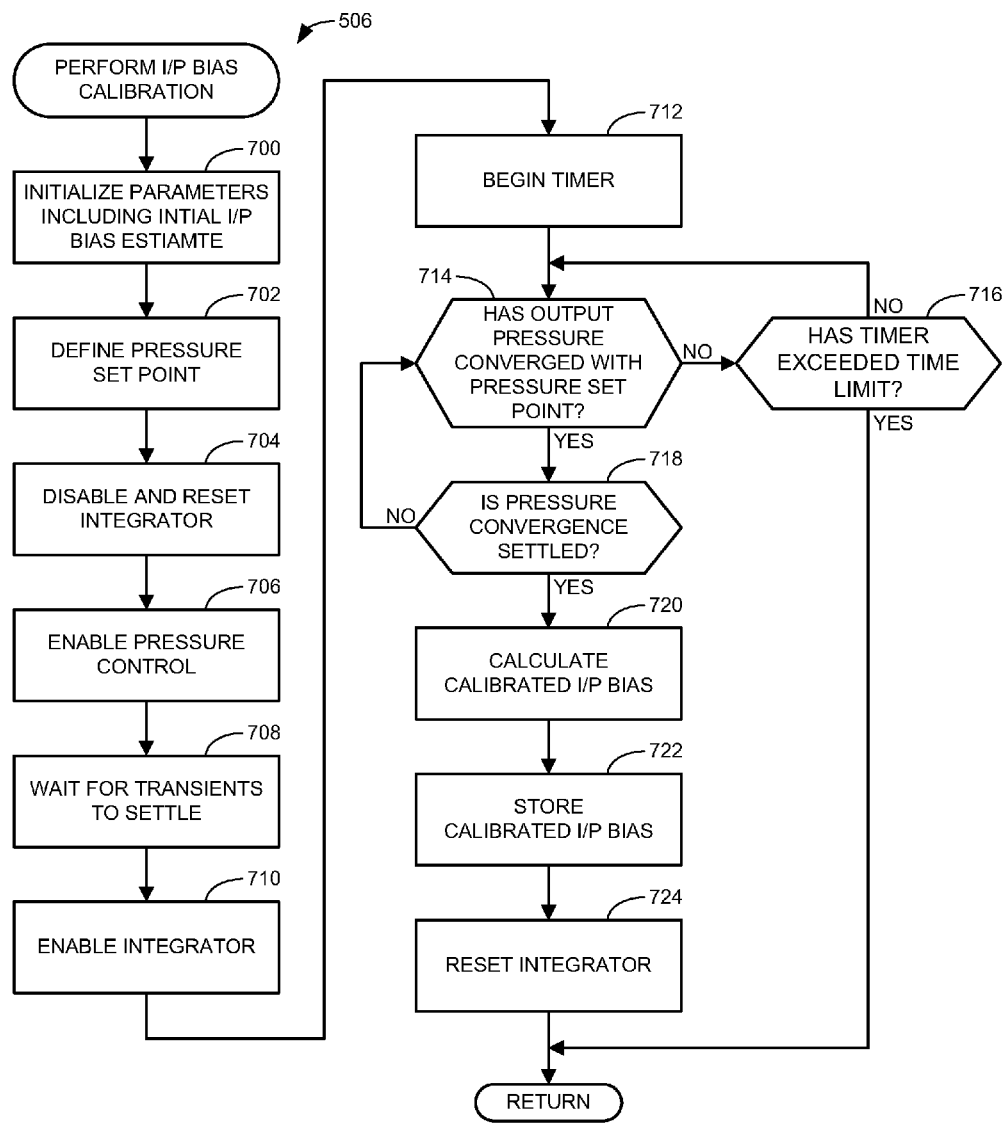

Flowcharts representative of example methods for implementing the example positioners 200, 300 of FIGS. 2 and/or 3 are shown in FIGS. 5-7 to calibrate the I/P bias 222. In this example, the methods may be implemented as machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 5-7, many other methods of implementing the example positioners 200, 300 may alternatively be used. For example, the order of execution of the blocks may be changed, and/or some of the blocks described may be changed, eliminated, or combined.

Turning in detail to FIGS. 5-7, the example process begins at block 500 where the microprocessor 202, 302 performs initial checks. In some examples, the initial checks include checking supply pressure, confirming proper instrument modes, checking for sensor failures, etc. At block 502, the example microprocessor 202, 302 determines whether any errors were detected (e.g., during the initial checks). If the example microprocessor 202, 302 determines that an error was detected, control advances to block 514 where the example microprocessor 202, 302 generates an error message after which the example process of FIG. 5 ends. If the example microprocessor 202, 302 determines that there are no errors, control continues to block 504 where the example microprocessor 202, 302 performs travel calibration. A more detailed description of the travel calibration (block 504) is provided below in connection with FIG. 6. At block 506 the example microprocessor 202, 302 performs I/P bias calibration. A more detailed description of the travel I/P bias (block 506) is provided below in connection with FIG. 7. At block 508, the microprocessor 202, 302 performs post-calibration checks. In some examples, the post-calibration checks confirms whether the calibration values are valid and/or whether there were any errors or failures to complete either the travel calibration or the I/P bias calibration. At block 510, the example microprocessor 202, 302 determines whether any errors were detected (e.g., during the post-calibration checks). If the example microprocessor 202, 302 determines that an error was detected, control advances to block 514 where the example microprocessor 202, 302 generates an error message after which the example process of FIG. 5 ends. If the example microprocessor 202, 302 determines that there are no errors, control continues to block 512. At block 512, the example microprocessor 202, 302 updates the positioner 200, 300 (e.g., based on the calibrated values determined at blocks 504 and 506) and then the example process of FIG. 5 ends.

FIG. 6 provides detail regarding the process contained within block 504 of FIG. 5 to perform travel calibration. In particular, the example process of FIG. 6 begins at block 600 where the example microprocessor 202, 302 determines whether the valve 210 is normally open. For example, the valve 210 may be a safety shutoff valve that is normally open except during a safety shutdown. In some examples, the microprocessor 202, 302 determines the normal position of the valve 210 to determine the order in which each end of the valve travel is calibrated because the ordering affects the performance of the I/P bias calibration described below in connection with FIG. 7. In particular, as described more fully below, the I/P bias calibration is performed at a hard stop (e.g., at one endpoint of valve travel span). In some examples, the valve 210 is maintained at the hard stop based on a hard cutoff (e.g., 0% pressure or 100% pressure). In other examples, the positioner 200, 300 maintains the valve 210 by controlling pressure to a set point outside of the bench set but inside the limits of the pressure supply (e.g., above 0% pressure and below 100% pressure). Such control at a hard stop based on pressure is herein referred to as endpoint pressure control. By implementing endpoint pressure control, wind up in the parameters in the positioner 200, 300 is reduced and the parameters are kept at or near the null state so that the positioner 200, 300 can respond more quickly to a control signal to actuate the valve 210 than control from a cutoff state. In some examples, the positioner 200, 300 can switch between cutoff pressure control and endpoint pressure control. In some examples, the set point for the I/P bias calibration is implemented using endpoint pressure control. In such examples, while the I/P bias calibration can be performed at either end of the valve travel, in some examples, the I/P bias calibration is performed when the valve is at the end of travel corresponding to normal operating conditions so that the set point for the I/P bias calibration is at the same end of valve travel as the set point for the endpoint pressure control of the valve during normal operation. In this way, if communications are lost or some other problem arises during the I/P bias calibration, the set point for the endpoint pressure control is already configured properly for normal operations, thereby reducing the likelihood of the valve 210 unintentionally being controlled to the wrong end of travel when the endpoint pressure control is reactivated. Further, in some examples, the I/P bias calibration is performed after travel calibration of the valve 210 with the travel calibration ending with the valve 210 moved to the endpoint of normal operation. In this manner, once the I/P calibration is completed, there is no need to stroke the valve back to the desired normal position, which can take a considerable amount of time for large valves (e.g., several minutes).

Accordingly, if the example microprocessor 202, 302 determines that the valve 210 is normally open (block 600), control advances to block 602 where the example microprocessor 202, 302 controls the valve to the fully closed position (e.g., opposite end of the normal position). At block 604, the example microprocessor 202, 302 detects the fully closed position (e.g., by detecting, via the position sensor 312, the position of the valve 210 when it hits a hard stop). At block 606, the example microprocessor 202, 302 controls the valve to the fully open position (e.g., corresponding to the normal position). At block 608, the example microprocessor 202, 302 detects the fully open position (e.g., by detecting, via the position sensor 312, the position of the valve 210 when it hits a hard stop) and then advances to block 618. At block 618, the example microprocessor 202, 302 stores the travel span based on the detected open and closed positions, after which the example process of FIG. 6 and control returns to the example process of FIG. 5 to perform the I/P bias calibration at block 506 (described more fully in FIG. 7).

Returning to block 600, if the example microprocessor 202, 302 determines that the valve 210 is not normally open (e.g., because it is normally closed), control advances to block 610 where the example microprocessor 202, 302 controls the valve to the fully open position (e.g., opposite end of the normal position). At block 612, the example microprocessor 202, 302 detects the fully open position. At block 614, the example microprocessor 202, 302 controls the valve to the fully closed position (e.g., corresponding to the normal position). At block 616, the example microprocessor 202, 302 detects the fully closed position and then advances to block 618 where the example microprocessor 202, 302 stores the travel span based on the detected open and closed positions. After which, the example process of FIG. 6 ends and control returns to the example process of FIG. 5 to perform the I/P bias calibration at block 506 (described more fully in FIG. 7). As shown in the illustrated example, the ending position of the valve 210 at either block 608 or block 616 corresponds to the normal operating position of the valve 210 as determined at block 600. In this manner, the valve 210 is already in position for the I/P bias calibration process at the hard stop corresponding to the normal operation position of the valve 210.

FIG. 7 provides detail regarding the process contained within block 506 of FIG. 5 to perform I/P bias calibration. In particular, the example process of FIG. 7 begins at block 700 where the example microprocessor 202, 302 initializes parameters including an initial I/P bias estimate. In some examples, the initial I/P bias estimate is an initial best estimate of the I/P bias needed to balance the positioner 200, 300 based on manufacturing specifications.

At block 702, the example microprocessor 202, 302 defines a pressure set point 212. In examples where the actuator is single acting, the pressure set point 212 may be any pressure between atmospheric pressure and the supply pressure. In examples where the actuator is double acting, the pressure set point 212 may be any pressure between the negative of the supply pressure and the supply pressure. In some examples, the pressure set point 212 corresponds to a position of the valve between each endpoint of the travel span. In some examples, the pressure set point 212 is defined to maintain the actuator 208 at a hard stop to ensure a fixed volume in the actuator 208 throughout the calibration test. As described above, in some examples, the hard stop is achieved by moving the valve 210 to an end of its travel span (e.g., fully open or fully closed). In some examples, the hard stop is defined more particularly to correspond to the end of the valve travel corresponding to the normal operating position of the valve 210. In the illustrated example, the valve 210 is already in its normal position based on the performance of the calibration test (block 504 of FIG. 5) as described above in connection with FIG. 6. In some such examples, the pressure associated with the valve 210 at the hard stop is determined as the initial conditions for the I/P bias calibration and the pressure set point 212 is defined (block 702) as a pressure outside the initial conditions pressure. That is, if the normal operating position corresponds to the valve 210 when the pressure is at the high end of the bench set (e.g., the high bench set pressure), the example microprocessor 202, 302 defines a pressure set point 212 above the pressure used to drive the valve 210 to its normal position. If the normal operating position corresponds to the valve 210 when the pressure is at the low end of the bench set (e.g., the low bench set pressure), the example microprocessor 202, 302 defines a pressure set point 212 below the pressure used to drive the valve 210 to its normal position. Using such a pressure set point 212 ensures that the actuator remains fixed at the corresponding hard stop. As a result, there is no motion in the valve 210 and the problems of stick-slip, lost motion, etc., of high-friction valves is removed from the control process thereby enabling more accurate and/or consistent determinations of the I/P bias. As a specific example, if the high pressure end corresponds to the normal position of the valve 210 and is associated with a pressure of 45 psi, the example microprocessor 202, 302 defines the pressure set point 212 at a pressure between 45 psi and an upper limit defined by the supply pressure. Likewise, if the high pressure end corresponds to the normal position of the valve 210 and is associated with a pressure of 25 psi, the example microprocessor 202, 302 defines the pressure set point 212 at a pressure between 25 psi and a lower limit defined by atmospheric pressure. In some examples, the example microprocessor 202, 302 sets the pressure set point 212 at a value relatively close (e.g., within 4 psi) of the initial conditions (e.g., the pressure associated with the relevant hard stop) to enable the controller 215 to converge faster with less unnecessary wind up that would occur in the case of a larger step in the pressure set point 212.

At block 704, the example microprocessor 202, 302 disables and resets (e.g., zeroes out the accumulator) the integrator 218. At block 706, the example microprocessor 202, 302 enables pressure control (e.g., begins control of the valve based on the output pressure feedback 214 relative to the defined pressure set point 212). At block 708, the example microprocessor 202, 302 waits for transients to settle. At block 710, the example microprocessor 202, 302 enables the integrator 218. In some examples, the process contained in blocks 704-610 of the illustrated example further reduces the effects of wind up in the integrator 218. As described above, when the pressure set point 212 is defined the set point is some distance (e.g., 4 psi) from the current (starting) conditions of the pressure at the normal operating position of the valve 210. In such settings, the error in the accumulator associated with the integrator 218 winds up, thereby requiring time to unwind before the system converges. Accordingly, in some examples, the integrator 218 is disabled (block 704) before the pressure control routine begins (block 706). In some examples, a specified period of time (e.g., 9 seconds) is allowed to elapse to smooth out the step input signal (block 708) at which point the integrator 218 is then enabled (block 710).

At block 712, the example microprocessor 202, 302 begins a timer. At block 714, the example microprocessor 202, 302 determines whether the output pressure (e.g., indicated by the output pressure feedback 214) has converged with the pressure set point 212. In some examples, the convergence is based on the absolute value of the difference between the output pressure feedback 214 and the pressure set point 212 being less than a threshold (e.g., less than 0.5 psi). If the example microprocessor 202, 302 determines that the output pressure has not converged with the pressure set point, control advances to block 716 where the example microprocessor 202, 302 determines whether the timer has exceeded a time limit. In some examples, the time limit defines an upper duration after which the calibration test is aborted for taking too long to converge. The time limit may be of any suitable length (e.g., 6 minutes, 10 minutes, etc.). If the example microprocessor 202, 302 determines that the timer has exceeded the time limit (block 716), the example process of FIG. 7 ends and returns to the example process of FIG. 5. If the example microprocessor 202, 302 determines that the timer has not exceeded the time limit (block 716), control returns to block 714 to continue controlling the output pressure towards convergence with the pressure set point 212.

At block 714, if the example microprocessor 202, 302 determines that the output pressure has converged with the pressure set point, control advances to block 718 where the example microprocessor 202, 302 determines whether the pressure convergence is settled. In some examples, the difference between the output pressure feedback 214 and the pressure set point 212 may be within the threshold for convergence but not actually converged because the output pressure is oscillating about the pressure set point. Accordingly, block 718 enables the example microprocessor 202, 302 to confirm whether the output pressure has settled on the set point. In some examples, the settling of the convergence is determined based on the output pressure remaining within the convergence threshold (e.g., +/−0.5 psi) of the set point for threshold convergence time period. The convergence time period may be of any suitable duration (e.g., 30 seconds, 55 seconds, 1 minute, etc.). If the example microprocessor 202, 302 determines that the pressure convergence is not settled, control returns to block 714 to continue controlling the output pressure towards convergence with the pressure set point 212. If the example microprocessor 202, 302 determines that the pressure convergence is settled, control advances to block 720.

At block 720, the example microprocessor 202, 302 calculates a final or calibrated I/P bias. In some examples, the calibrated I/P bias equals the initial I/P bias estimate (defined at block 700) plus the value in the accumulator of the integrator 218. In some examples, the calibrated I/P bias equals a running I/P bias that was updated directly from the integrator output as the output pressure is controlled towards the pressure set point. That is, the running I/P bias is initially assigned the value of the initial I/P bias estimate, then as an integrator value is determined at each sampling interval, the value is added to the running I/P bias to generate a new value for the running I/P bias. The running I/P bias is updated with the integrator value at each sampling interval until the output pressure converges with the pressure set point. The final value for the running I/P bias corresponds to the calibrated I/P bias. At block 722, the example microprocessor 202, 302 stores the calibrated I/P bias. At block 724, the example microprocessor 202, 302 resets the integrator 218 (e.g., sets the accumulator value back at zero) at which point the example process of FIG. 7 ends and control returns to the example process of FIG. 5 as described above.

Figure 8:
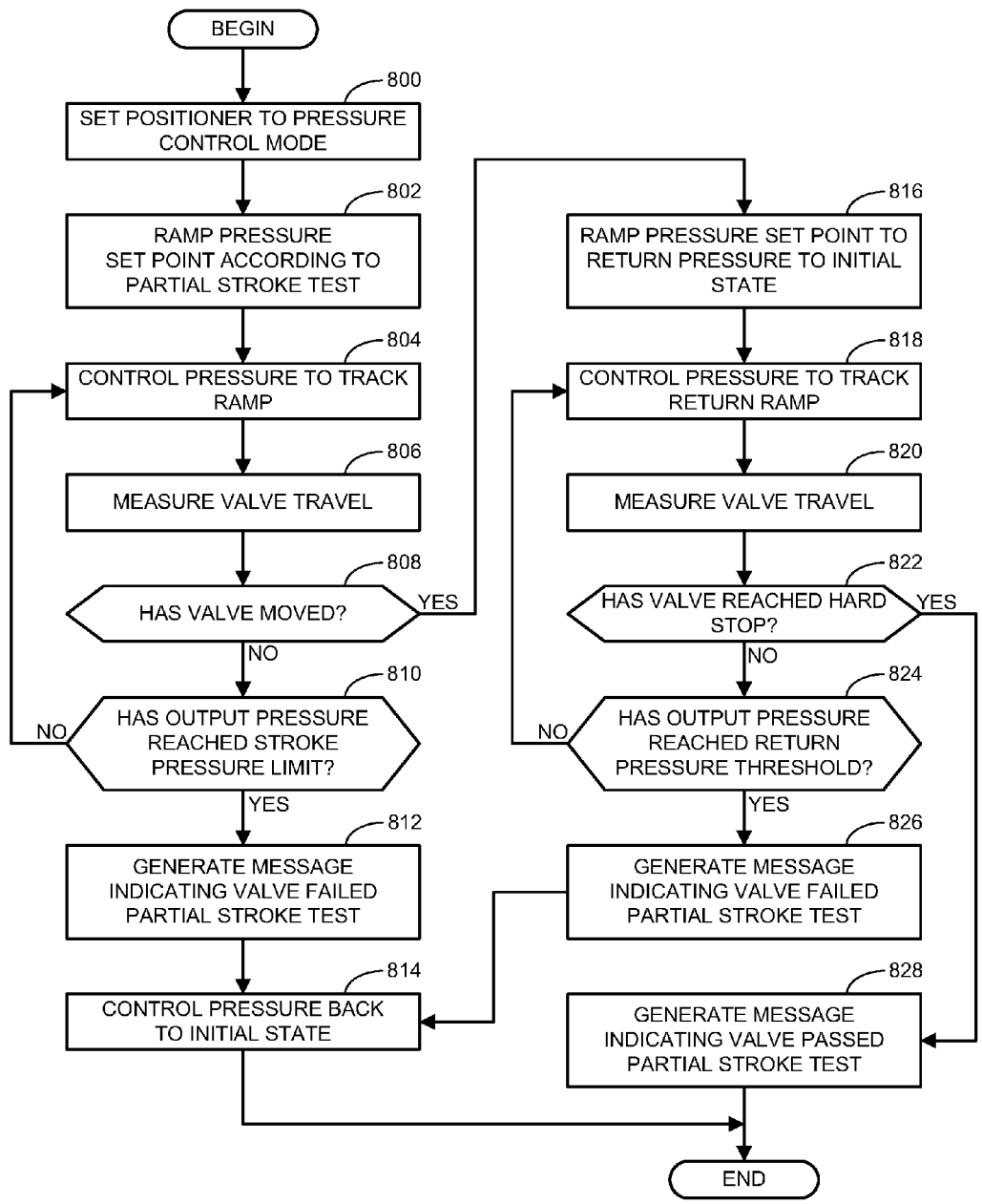
FIG. 8 is a flowchart representative of an example method for implementing the example positioners of FIGS. 2 and/or 3 to perform a partial stroke test on a pneumatically actuated valve.

A flowchart representative of an example method for enabling the example positioners 200, 300 of FIGS. 2 and/or 3 to implement a partial stroke test on a valve is shown in FIG. 8. In this example, the method may be implemented using machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 8, many other methods of implementing the example positioners 200, 300 may alternatively be used. For example, the order of execution of the blocks may be changed, and/or some of the blocks described may be changed, eliminated, or combined.

Turning in detail to FIG. 8, the example process begins at block 800 where the example microprocessor 202, 302 sets the example positioner 200, 200 to pressure control mode. At block 802, the example microprocessor 202, 302 ramps the pressure set point 212 according to a partial stroke test. In some examples, the ramp defined by the partial stroke test includes a particular rate of change in the pressure set point (e.g., −1 psi/sec) and a particular stroke pressure threshold beyond which the output pressure is not to pass. At block 804, the example microprocessor 202, 302 controls pressure (e.g., based on the output pressure feedback 214) to track the ramp. In a partial stroke test, the valve 210 is controlled to be stroked away from its initial (e.g., normal) position and then returned to its initial position. For purposes of this patent, the term "stroke direction" is hereby expressly defined to mean the direction of movement of the flow control member of the valve 210 when moving away from the initial position of the valve 210 during a partial stroke test. Further, the term "return direction" is hereby expressly defined to mean the direction of movement of the flow control member of the valve 210 when moving towards the initial position of the valve 210 during a partial stroke test (e.g., after the valve has been partially stroked in the stroke direction). Thus, in the illustrated example of FIG. 8, the pressure controlled (at block 804) based on the pressure set point 212 (defined at block 802) serves to actuate the valve 210 in the stroke direction. At block 806, the example microprocessor 202, 302 measures the valve travel (e.g., via the position sensor 312). At block 808, the example microprocessor 202, 302 determines whether the valve 210 has moved. In some examples, there may be significant lost motion between the actuator 208 and a shaft or stem of the valve 210 and between the shaft or stem and the flow control member (e.g., disc, plug, etc.). Accordingly, in some examples, the example microprocessor 202, 302 determines that the valve 210 has moved after the valve travel exceeds a minimum threshold displacement (e.g., 5% of the travel span). In some examples, the microprocessor 202, 302 determines that the valve 210 has moved when the valve travel reaches a specified target travel position (e.g., 25% off of the initial position of the valve 210).

If the example microprocessor 202, 302 determines that the valve 210 has not moved (e.g., the position of the valve 210 is within the minimum threshold displacement), control advances to block 810 where the example microprocessor 202, 302 determines whether the output pressure has reached the stroke pressure threshold set for the ramp. If the example microprocessor 202, 302 determines that the output pressure has not reached the stroke pressure threshold, control returns to block 804 to continue tracking the ramp. If the example microprocessor 202, 302 determines that the output pressure has reached the stroke pressure threshold, control advances to block 812 where the example microprocessor 202, 302 generates a message (e.g., an alert) indicating the valve 210 failed the partial stroke test. At block 814, the example microprocessor 202, 302 (e.g., via the pressure controller 215) controls the pressure back to the initial state (e.g., before beginning the partial stroke test) at which point the example process of FIG. 8 ends.

Returning to block 808, if the example microprocessor 202, 302 determines that the valve 210 has moved (e.g., a movement exceeding a minimum threshold displacement of 5% travel span), control advances to block 816. Blocks 816-826 generally correspond to respective blocks 802-712 described above except that the valve 210 is now on a return path (e.g., moving in the return direction) to its initial position after having moved according to the ramped pressure set point. In this manner, the partial stroke test not only confirms that the valve 210 can move in the stroke direction but also that the valve does not become stuck when moved back in the return direction to its initial position (e.g., normal operating position).

In particular, at block 816, the example microprocessor 202, 302 ramps the pressure set point 212 to return the pressure to its initial state. In some examples, the ramp corresponds to the reverse of the ramp defined at block 802 with a corresponding rate of change in the pressure set point (e.g., +1 psi/sec) and a particular pressure threshold (e.g., 5 psi above the high bench set pressure) beyond which the output pressure is not to pass without the valve returning to its initial position. At block 818, the example microprocessor 202, 302 controls pressure (e.g., based on the output pressure feedback 214) to track the return ramp. At block 820, the example microprocessor 202, 302 measures the valve travel (e.g., via the position sensor 312). At block 822, the example microprocessor 202, 302 determines whether the valve 210 has reached a hard stop. In some examples, there may be significant lost motion between the actuator 208 and a shaft or stem of the valve 210 and between the shaft or stem and the flow control member (e.g., disc, plug, etc.). Accordingly, in some examples, the example microprocessor 202, 302 determines that the valve 210 has reached a hard stop when the travel position of the valve 210 is within a minimum threshold displacement of the calibrated hard stop position (e.g., 5% of the travel span).

If the example microprocessor 202, 302 determines that the valve 210 has not reached the hard stop, control advances to block 824 where the example microprocessor 202, 302 determines whether the output pressure has reached a return pressure threshold. If the example microprocessor 202, 302 determines that the output pressure has not reached the return pressure threshold, control returns to block 818 to continue tracking the return ramp. If the example microprocessor 202, 302 determines that the output pressure has reached the return pressure threshold, control advances to block 826. At block 826, the example microprocessor 202, 302 generates a message (e.g., an alert) indicating the valve 210 failed the partial stroke test, at which point control returns to block 814 where the example microprocessor 202, 302 (e.g., via the pressure controller 215) controls the pressure back to the initial state. Returning to block 822, if the example microprocessor 302 determines that the valve 210 has reached the hard stop, control advances to block 828. At block 828, the example microprocessor 302 generates a message indicating the valve 210 passed the partial stroke test, at which point the example process of FIG. 8 ends.

Figure 9:
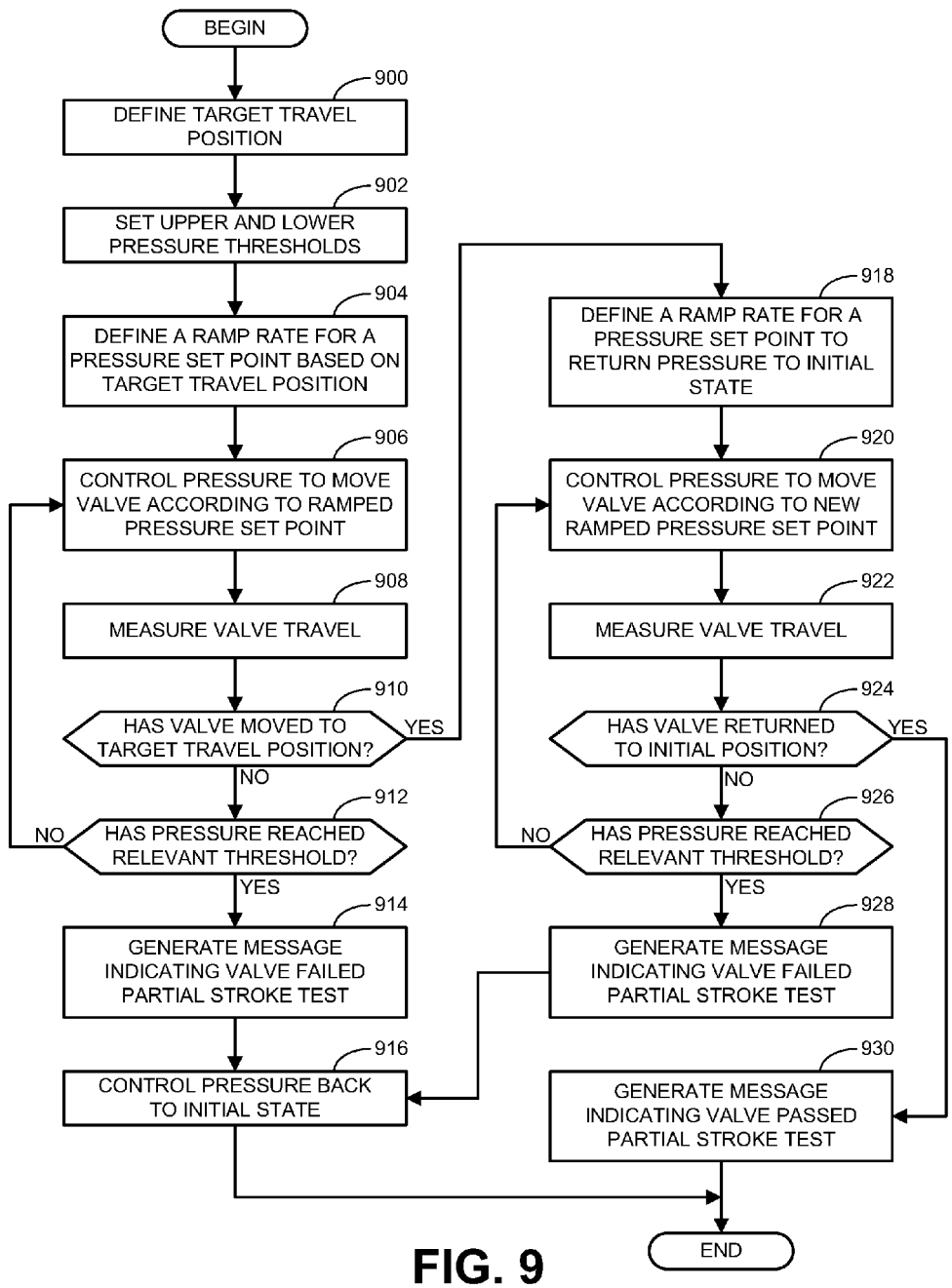
FIG. 9 is a flowchart representative of an example method for implementing the example positioners of FIGS. 2 and/or 3 to perform a partial stroke test on a pneumatically actuated valve.

A flowchart representative of an example method for enabling the example positioners 300 of FIG. 3 to implement a partial stroke test on a valve is shown in FIG. 9. In this example, the method may be implemented using machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example positioners 300 may alternatively be used. For example, the order of execution of the blocks may be changed, and/or some of the blocks described may be changed, eliminated, or combined.

Turning in detail to FIG. 9, the example process begins at block 900 where the example microprocessor 302 (e.g., via the travel controller 304) defines a target travel position. In some examples, the target travel position corresponds to a position on the travel span part way away from the initial position of the valve 210 (e.g., 90% travel when the valve 210 is normally positioned at 100% travel). In some examples, the target travel position corresponds to the travel span endpoint opposite the endpoint where the valve 210 is normally positioned. Thus, in some examples, rather than a partial stroke test, the example positioner 300 implements a full stroke test of the valve 210. At block 902, the example microprocessor 302 (e.g., via the limiter 306) sets upper and lower pressure thresholds. In some examples, one or both of the upper and lower pressure thresholds serves as a limit on the range or extent of the output pressure. In some examples, one or both of the upper and lower pressure thresholds serves as a trigger for an alert or alarm but does not otherwise limit control of the output pressure. At block 904, the example microprocessor 302 (e.g., via the limiter 306) defines a ramp rate for a pressure set point 212 based on the target travel position. At block 906, the example microprocessor 302 controls pressure (e.g., based on the output pressure feedback 214) to move the valve 210 in the stroke direction according to the ramped pressure set point 212. At block 908, the example microprocessor 302 measures the valve travel (e.g., via the position sensor 312). At block 910, the example microprocessor 302 determines whether the valve 210 has reached the target travel position.

If the example microprocessor 302 determines that the valve 210 has not reached the target travel position, control advances to block 912 where the example microprocessor 302 determines whether the pressure has reached the relevant pressure threshold. The relevant pressure threshold depends upon the initial state of the system before the partial stroke test. For example, if the valve 210 begins at the end of travel corresponding to the high end of the bench set (e.g., high pressure), the partial stroke test involves venting the actuator 208 to lower the pressure. Accordingly, the relevant pressure threshold, in such an example, is the lower pressure threshold. In some such examples, the lower pressure threshold is a limit to ensure the pressure is not lowered too far. By contrast, if the valve 210 begins at the end of travel corresponding to the low end of the bench set (e.g., low pressure), the partial stroke test involves filling the actuator 208 to raise the pressure and the relevant pressure threshold becomes the upper pressure threshold. Thus, if the example microprocessor 302 determines that the pressure has not reached the relevant pressure threshold (block 912), control returns to block 906 to continue controlling the pressure according to the ramped pressure set point 212. If the example microprocessor 302 determines that the pressure has reached the relevant pressure threshold (block 912), control advances to block 914 where the example microprocessor 302 generates a message (e.g., an alert) indicating the valve 210 failed the partial stroke test. Control then advances to block 916 where the example microprocessor 302 (e.g., via the pressure controller 215) controls the pressure back to the initial state (e.g., before beginning the partial stroke test) at which point the example process of FIG. 8 ends.

Returning to block 910, if the example microprocessor 302 determines that the valve 210 has reached the target travel position, control advances to block 918. Blocks 918-830 generally correspond to respective blocks 904-814 described above except that the valve 210 is now on its return path to its initial position after having successfully moved to the target travel position. In this manner, the partial stroke test not only confirms that the valve 210 can move but also that it does not become stuck when moved back to its normal position.

In particular, at block 918, the example microprocessor 302 (e.g., via the limiter 306) defines a ramp rate for a pressure set point 212 to return the pressure to its initial state. At block 920, the example microprocessor 302 controls pressure (e.g., based on the output pressure feedback 214) to move the valve 210 in the return direction according to the new ramped pressure set point 212. At block 922, the example microprocessor 302 measures the valve travel (e.g., via the position sensor 312). At block 924, the example microprocessor 302 determines whether the valve 210 has reached the initial position. If the example microprocessor 302 determines that the valve 210 has not reached the initial position (e.g., within a minimum threshold displacement), control advances to block 926 where the example microprocessor 302 determines whether the pressure has reached the relevant pressure threshold. Here, the relevant pressure threshold is the opposite pressure threshold to the relevant pressure threshold used at block 912. That is, if the lower pressure threshold is relevant at block 912, the upper pressure threshold is relevant at block 926. Likewise, if the upper pressure threshold is relevant at block 912, the lower pressure threshold is relevant at block 926. In some examples, the relevant pressure threshold determined at block 926 serves as a trigger for an alert but does not otherwise limit control of the output pressure. If the example microprocessor 302 determines that the pressure has not reached the relevant pressure threshold (block 926), control returns to block 920 to continue controlling the pressure according to the new ramped pressure set point 212. If the example microprocessor 302 determines that the pressure has reached the relevant pressure threshold (block 926), control advances to block 928. At block 928, the example microprocessor 302 generates a message (e.g., an alert) indicating the valve 210 failed the partial stroke test, at which point control returns to block 916 where example microprocessor 302 (e.g., via the pressure controller 215) continues to control the pressure back to the initial state. Returning to block 924, if the example microprocessor 302 determines that the valve 210 has reached the initial position, control advances to block 930. At block 930, the example microprocessor 302 generates a message indicating the valve 210 passed the partial stroke test, at which point the example process of FIG. 9 ends.

As mentioned above, the example methods of FIGS. 5-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 5-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 10:
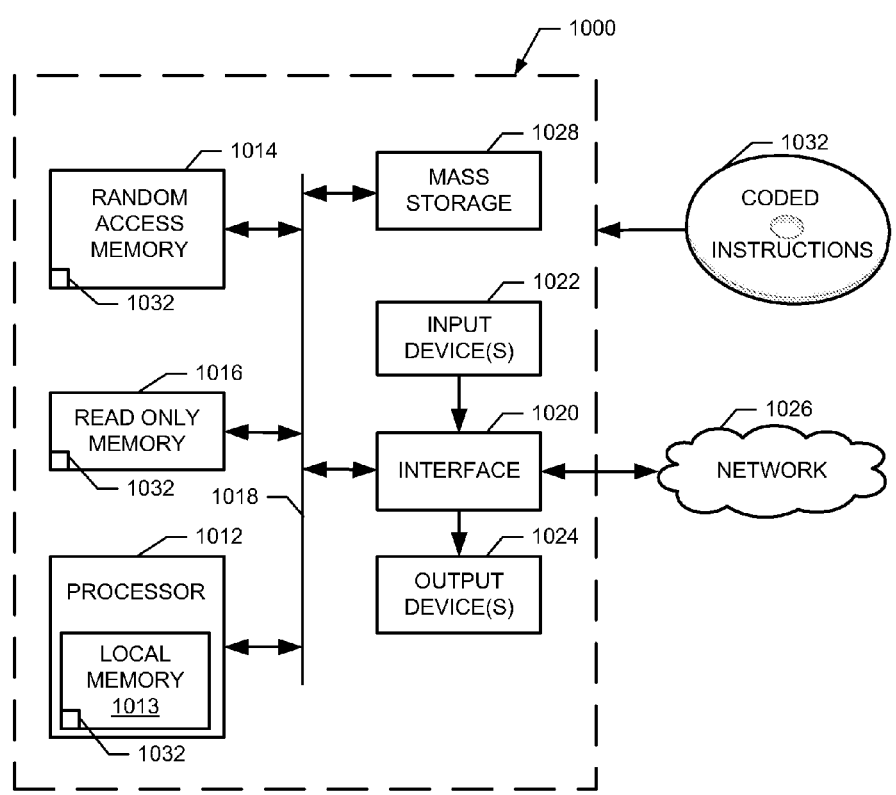
FIG. 10 is a schematic illustration of an example processor platform that may be used and/or programmed to carry out the example methods of FIGS. 5-9 and/or, more generally, to implement the example positioners of FIGS. 2 and/or 3.

FIG. 10 is a block diagram of an example processor platform 1000 capable of executing instructions to implement the methods of FIGS. 5-9 and, more generally, the positioners 200, 300 of FIGS. 2 and/or 3. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 to implement the methods of FIGS. 5-8 may be stored in the mass storage device 1028, in the volatile memory 1014, in the non-volatile memory 1016, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    generating a first pressure set point for a valve positioner coupled to an actuator to actuate a first valve, the valve positioner including a fluidly-actuated second valve;
    controlling, with the fluidly-actuated second valve, an output pressure of the positioner towards the first pressure set point to actuate the first valve in a stroke direction;
    defining a target travel position associated with a partial stroke test of the first valve;
    measuring a position of the first valve;
    generating a second pressure set point after the position of the first valve reaches the target travel position to actuate the first valve in a return direction towards an initial position of the first valve associated with the position of the first valve before the partial stroke test;
    controlling, with the fluidly-actuated second valve, the output pressure of the positioner towards the second pressure set point;
    defining a pressure threshold associated with the second pressure set point;
    defining a threshold displacement of the first valve from the initial position; and
    determining that the first valve is stuck while controlling the first valve in the return direction if the output pressure passes the pressure threshold associated with the second pressure set point while the position of the first valve is outside the threshold displacement from the initial position.

2. The method of claim 1, further comprising:
    converting, with a current-to-pressure transducer of the valve positioner in fluid communication with the fluidly-actuated second valve, an electrical signal based on the first pressure set point and a bias to a pressure signal; and
    controlling, with the fluidly-actuated second valve, the output pressure of the positioner towards the first pressure set point based on the pressure signal.

3. The method of claim 1, further comprising ramping the first pressure set point over time to actuate the first valve as the output pressure is controlled towards the first pressure set point.

4. The method of claim 1, further comprising:
    defining a pressure threshold associated with the first pressure set point; and
    determining that the first valve is stuck while controlling the first valve in the stroke direction if the output pressure passes the pressure threshold associated with the first pressure set point before the position of the first valve reaches the target travel position.

5. The method of claim 4, further comprising:
    determining an initial output pressure associated with the positioner before the partial stroke test; and
    controlling, with the fluidly-actuated second valve, the output pressure of the positioner back to the initial output pressure after determining the first valve is stuck while controlling the first valve in the stroke direction.

6. The method of claim 1, wherein the first valve is a safety shutoff valve.

7. The method of claim 1, wherein the first valve is an on-off valve.

8. The method of claim 1, wherein friction in the first valve creates stick-slip dynamics when the first valve is actuated.

9. A valve positioner comprising:
    a travel controller to:
        define a target travel position for a first valve coupled to the valve positioner via an actuator; and
        monitor a position of the first valve;
    a pressure controller including a fluidly-actuated second valve to:
        control, during a partial stroke test, an output pressure of the positioner towards a first pressure set point to actuate the first valve towards the target travel position as the output pressure is controlled towards the first pressure set point; and
        control, during the partial stroke test, the output pressure of the positioner towards a second pressure set point after the position of the first valve reaches the target travel position, the second pressure set point to actuate the first valve towards an initial position of the first valve associated with the position of the first valve before the partial stroke test; and
    a limiter to define a pressure threshold associated with the second pressure set point and to define a threshold displacement of the first valve from the initial position, the pressure controller to generate an alert indicating that the first valve is stuck if the output pressure passes the pressure threshold associated with the second pressure set point while the position of the first valve is outside the threshold displacement from the initial position.

10. The valve positioner of claim 9, wherein:
the pressure controller includes a current-to-pressure transducer in fluid communication with the fluidly-actuated second valve, the current-to-pressure transducer to convert an electrical signal based on the first pressure set point and a bias to a pressure signal, the fluidly-actuated second valve to control the output pressure of the positioner towards the first pressure set point based on the pressure signal.

11. The valve positioner of claim 9, wherein the limiter is to define a pressure threshold associated with the first pressure set point, the pressure controller to generate an alert indicating that the first valve is stuck if the output pressure passes the pressure threshold associated with the first pressure set point before the position of the first valve reaches the target travel position.

12. A tangible computer readable storage medium comprising instructions that, when executed, cause a machine to at least:
generate a first pressure set point for a valve positioner coupled to an actuator to actuate a first valve, the valve positioner including a fluidly-actuated second valve;
control, with the fluidly-actuated second valve, an output pressure of the positioner towards the first pressure set point to actuate the first valve in a stroke direction;
define a target travel position associated with a partial stroke test of the first valve;
measure a position of the first valve;
generate a second pressure set point after the position of the first valve reaches the target travel position to actuate the first valve in a return direction towards an initial position of the first valve associated with the position of the first valve before the partial stroke test;
control, with the fluidly-actuated second valve, the output pressure of the positioner towards the second pressure set point;
define a pressure threshold associated with the second pressure set point;
define a threshold displacement of the first valve from the initial position; and
determine that the first valve is stuck while controlling the first valve in the return direction if the output pressure passes the pressure threshold associated with the second pressure set point while the position of the first valve is outside the threshold displacement from the initial position.

13. The computer readable storage medium of claim 12, wherein the instructions further cause the machine to:
convert, with a current-to-pressure transducer of the valve positioner in fluid communication with the fluidly-actuated second valve, an electrical signal based on the first pressure set point and a bias to a pressure signal; and
control, with the fluidly-actuated second valve, the output pressure of the positioner towards the first pressure set point based on the pressure signal.

14. The computer readable storage medium of claim 12, wherein the instructions further cause the machine to ramp the first pressure set point over time to actuate the first valve as the output pressure is controlled towards the first pressure set point.

15. The computer readable storage medium of claim 12, wherein the instructions further cause the machine to:
define a pressure threshold associated with the first pressure set point; and
determine that the first valve is stuck while controlling the first valve in the stroke direction if the output pressure passes the pressure threshold associated with the first pressure set point before the position of the first valve reaches the target travel position.

16. The computer readable storage medium of claim 15, wherein the instructions further cause the machine to:
determine an initial output pressure associated with the positioner before the partial stroke test; and
control, with the fluidly-actuated second valve, the output pressure of the positioner back to the initial output pressure after determining the first valve is stuck while controlling the first valve in the stroke direction.

* * * * *